(12) United States Patent
Matsuno et al.

(10) Patent No.: US 8,958,967 B2
(45) Date of Patent: Feb. 17, 2015

(54) VEHICLE BRAKING-FORCE CONTROL DEVICE

(75) Inventors: Koji Matsuno, Tokyo (JP); Takeshi Yoneda, Tokyo (JP); Masato Igarashi, Tokyo (JP); Yosuke Morokuma, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1591 days.

(21) Appl. No.: 12/071,697

(22) Filed: Feb. 25, 2008

(65) Prior Publication Data

US 2008/0208427 A1 Aug. 28, 2008

(30) Foreign Application Priority Data

Feb. 26, 2007 (JP) ................................ 2007-046198

(51) Int. Cl.
*B60T 7/12* (2006.01)
*B60T 8/1755* (2006.01)
*B60W 10/06* (2006.01)
*B60W 10/184* (2012.01)
*B60W 30/18* (2012.01)

(52) U.S. Cl.
CPC .............. *B60T 8/1755* (2013.01); *B60W 10/06* (2013.01); *B60W 10/184* (2013.01); *B60W 30/18109* (2013.01)
USPC ..................... 701/83; 701/80; 701/84; 701/91

(58) Field of Classification Search
CPC ........... B60T 8/00; B60T 8/171; B60T 8/172; B60T 8/175; B60T 8/1755; B60T 8/17551; B60T 8/17552; B60T 8/17554; B60T 8/17555; B60T 8/176; B60T 8/1761; B60T 8/17613; B60T 8/17616; B60T 8/1763; B60T 8/17633; B60T 8/17636; B60T 8/1764; B60T 8/1766; B60T 8/1769; B60W 10/04; B60W 10/06; B60W 10/08; B60W 10/18; B60W 10/182; B60W 10/184; B60W 10/188; B60W 10/192; B60W 2510/064; B60W 2510/0647; B60W 2510/0657; B60W 2510/069; B60W 2510/0695; B60W 2510/1065; B60W 2510/207; B60W 30/045; B60W 30/18072; B60W 30/18109; B60W 30/18136; B60W 30/18172; B60W 40/00; B60W 40/06; B60W 40/064; B60W 40/068; B60W 40/10; B60W 40/101; B60W 40/103; B60W 40/105; B60W 40/107; B60W 40/109; B60W 40/11; B60W 40/112; B60W 40/114; B60W 40/12; B60W 40/13; B60Y 2300/18133
USPC ........................................................ 701/80
See application file for complete search history.

(56) References Cited

U.S. PATENT DOCUMENTS 5,694,321 A * 12/1997 Eckert et al. ..................... 701/91
5,927,421 A * 7/1999 Fukada ........................ 180/197

(Continued)

FOREIGN PATENT DOCUMENTS

JP 2001-233195 8/2001

*Primary Examiner* — Jerrah Edwards
(74) *Attorney, Agent, or Firm* — Smith, Gambrell & Russell LLP (57) ABSTRACT

A braking-force control device has a brake control function for performing brake control on a front outside wheel when a vehicle is detected to be in an oversteer condition during a turning operation and for performing brake control on a rear inside wheel when the vehicle is detected to be in an understeer condition during a turning operation. For preventing the oversteer condition, a command for reducing the engine torque is output. On the other hand, for preventing the understeer condition, the engine torque is limited in accordance with a permissible engine torque value that is calculated on the basis of a road-surface friction coefficient, and ground loads and lateral tire forces of individual wheels. If it is detected that engine braking is in operation, the engine torque is adjusted to substantially zero.

19 Claims, 8 Drawing Sheets

(56) References Cited

U.S. PATENT DOCUMENTS

| | | | |
|---|---|---|---|
| 6,308,127 B1 * | 10/2001 | Tsunehara | 701/84 |
| 6,324,458 B1 * | 11/2001 | Takagi et al. | 701/70 |
| 6,415,215 B1 | 7/2002 | Nishizaki et al. | |
| 6,549,842 B1 * | 4/2003 | Hac et al. | 701/80 |
| 2004/0117099 A1 * | 6/2004 | Inagaki et al. | 701/70 |
| 2009/0112435 A1 * | 4/2009 | Meyers et al. | 701/78 |

* cited by examiner

VEHICLE BRAKING-FORCE CONTROL DEVICE

CROSS REFERENCES TO RELATED APPLICATIONS

The disclosure of Japanese Patent Application No. 2007-046198 filed on Feb. 26, 2007 including the specifications, drawings, and abstracts are incorporated by references herein.

BACKGROUND OF THE INVENTION

1. Field of the Invention

The present invention relates to a vehicle braking-force control device that apply braking forces to predetermined wheels to prevent skidding and that appropriately control driving forces.

2. Description of the Related Art

In recent years, a braking-force control device have been developed and put to practical use in vehicles, which detects an oversteer condition and an understeer condition of a vehicle and applies a braking force to a predetermined wheel to prevent the vehicle from skidding.

For example, Japanese Unexamined Patent Application Publication No. 2001-233195 (having U.S. Pat. No. 6,415,215 as a family member) discloses a technology that increases braking forces of both front and rear outside wheels when the vehicle is in an oversteer condition during a turning operation so as to generate yaw moment on the outer side of the vehicle in the course of turning. On the other hand, when the vehicle is in an understeer condition during a turning operation, the braking forces of front and rear inside wheels are increased so that yaw moment is generated on the inner side of the vehicle in the course of turning.

However, with a skidding preventing device like the one disclosed in Japanese Unexamined Patent Application Publication No. 2001-233195, when an oversteer condition of a vehicle is to be prevented by performing brake control on the wheels, if a driving force from the engine is applied to the wheels receiving the braking forces, a function for adjusting the lateral grip forces of the wheels with the braking forces may somewhat lose effect. On the other hand, if the engine output is over-reduced for preventing an understeer condition, the control may become rather uncomfortable for the driver accelerating with the vehicle while expecting and permitting the understeer condition to some extent.

SUMMARY OF THE INVENTION

The present invention has been made under such circumstances, and it is an object of the present invention to provide a vehicle braking-force control device that allows for improved stability of a vehicle when performing brake control for preventing an oversteer condition or an understeer condition of the vehicle, and that can perform control that sufficiently reflects the driver's intention for acceleration.

The present invention provides a vehicle braking-force control device that includes road-surface friction coefficient estimator configured to estimate a road-surface friction coefficient; ground-load estimator configured to estimate ground loads acting on individual wheels; lateral-tire-force estimator configured to estimate lateral tire forces acting on the individual wheels; permissible-engine-torque calculator configured to calculate the permissible engine torque on the basis of the road-surface friction coefficient, the ground loads of the individual wheels, and the lateral tire forces of the individual wheels; vehicle-behavior detector configured to at least detect whether a vehicle is running in an oversteer condition or an understeer condition; brake controller configured to perform brake control on an outside turning wheel when the oversteer condition is detected, and to perform brake control on an inside turning wheel when the understeer condition is detected; and engine-torque controller configured to reduce an engine torque to an amount lower than that of a current engine torque when the oversteer condition is detected, and to limit an engine torque in accordance with the permissible engine torque when the understeer condition is detected.

The vehicle braking-force control device according to the present invention allows for improved stability of a vehicle when performing brake control for preventing an oversteer condition or an understeer condition of the vehicle, and can perform control that sufficiently reflects the driver's intention for acceleration.

DESCRIPTION OF THE PREFERRED EMBODIMENTS

Embodiments of the present invention will now be described with reference to the drawings.

Figure 1:
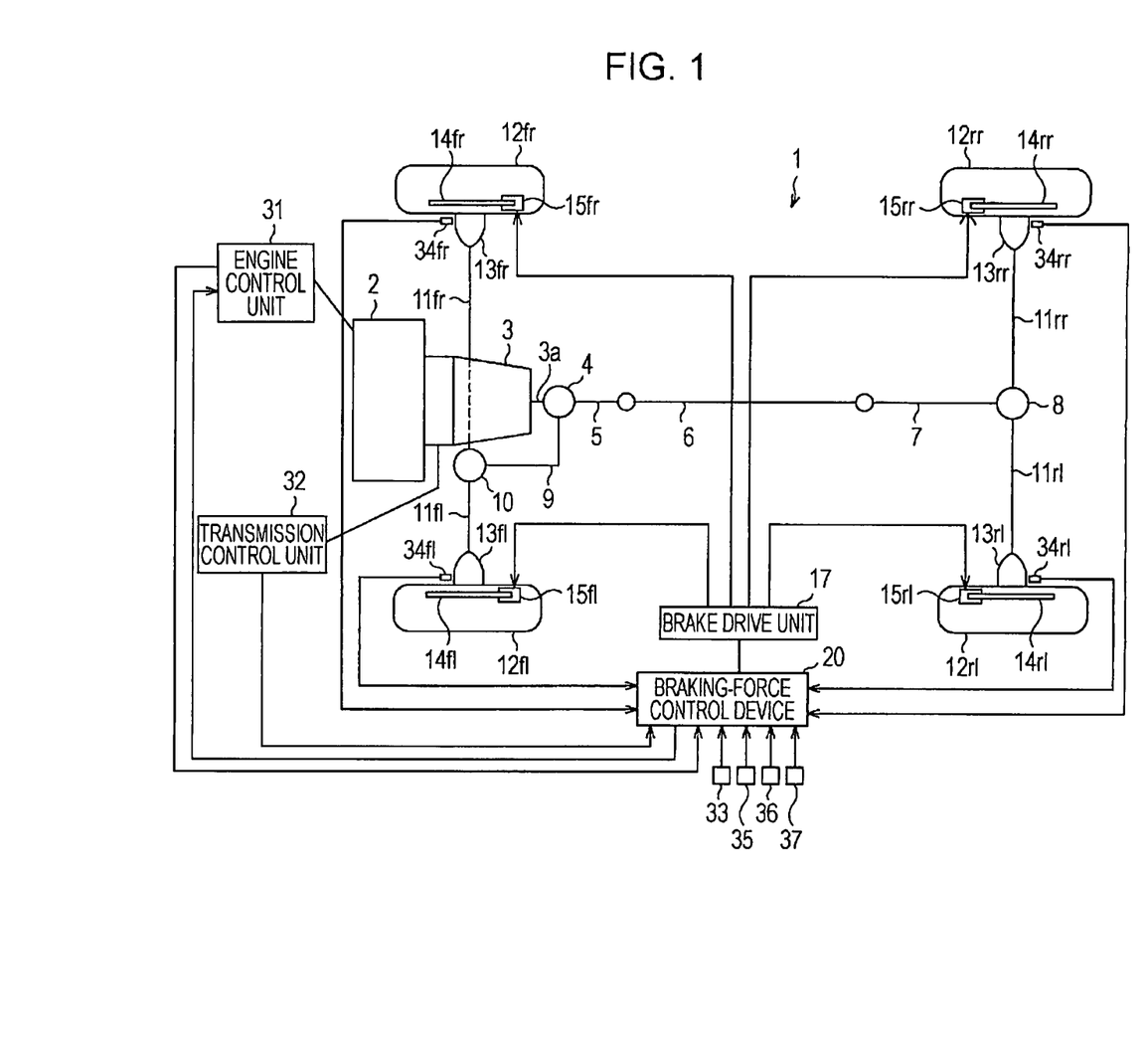
FIG. 1 is a schematic overall view of a vehicle equipped with a braking-force control device.

FIGS. 1 to 8 illustrate an embodiment of the present invention. Referring to FIG. 1, reference numeral 1 denotes a vehicle, such as an automobile. A driving force from an engine 2 of the vehicle 1 is transmitted to a center differential device 4 via an automatic transmission 3 (including a torque converter) located rearward of the engine 2 and via a transmission output shaft 3a.

The driving force transmitted to the center differential device 4 is input to a rear-wheel final reduction apparatus 8 via a rear drive shaft 5, a propeller shaft 6, and a drive pinion shaft 7, and is also sent to a front-wheel final reduction apparatus 10 from the center differential device 4 via a gear array (not shown) and a front drive shaft 9.

The driving force received by the rear-wheel final reduction apparatus 8 is transmitted to a left rear wheel 12$rl$ via a left-rear-wheel axle shaft 11$rl$ and to a right rear wheel 12$rr$ via a right-rear-wheel axle shaft 11$rr$. On the other hand, the driving force received by the front-wheel final reduction gear 10 is transmitted to a left front wheel 12$fl$ via a left-front-wheel axle shaft 11$fl$ and to a right front wheel 12$fr$ via a right-front-wheel axle shaft 11$fr$.

The axle shafts 11$fl$, 11$fr$, 11$rl$, and 11$rr$ are rotatably supported by axle housings 13$fl$, 13$fr$, 13$rl$, and 13$rr$, respectively, by means of bearings (not shown). The axle housings 13$fl$, 13$fr$, 13$rl$, and 13$rr$ each have a back plate (not shown) attached thereto. Brake disc rotors 14$fl$, 14$fr$, 14$rl$, 14$rr$ are housed in the respective back plates in a rotatable fashion together with the wheels 12*fl*, 12*fr*, 12*rl*, and 12*rr*, and can be braked by being clamped by brake pads 15*fl*, 15*fr*, 15*rl*, and 15*rr* disposed within caliper bodies (not shown).

Reference numeral 17 denotes a brake drive unit of the vehicle. The brake drive unit 17 is connected to a master cylinder (not shown) that is connected with a brake pedal manipulatable by the driver. When the driver manipulates the brake pedal, the master cylinder applies brake pressure to wheel cylinders (not shown) of the four wheels 12*fl*, 12*fr*, 12*rl*, and 12*rr* via the brake drive unit 17. This actuates the brake pads 15*fl*, 15*fr*, 15*rl*, and 15*rr*, thereby braking and stopping the four wheels 12*fl*, 12*fr*, 12*rl*, and 12*rr*.

The brake drive unit 17 is a hydraulic unit equipped with, for example, a pressurizing source, a pressure-reducing valve, and a pressure-intensifying valve. Other than in response to the brake manipulation performed by the driver, the brake drive unit 17 can apply brake pressure individually to the wheel cylinders in response to an input signal from a braking-force control device 20 to be described hereinafter so as to apply brakes to the four wheels 12*fl*, 12*fr*, 12*rl*, and 12*rr* individually.

The braking-force control device 20 has a brake-control function for performing brake control on the front outside wheel when the vehicle 1 is detected to be in an oversteer condition during a turning operation, and for performing brake control on the rear inside wheel when the vehicle 1 is detected to be in an understeer condition during a turning operation. For preventing the oversteer condition, the braking-force control device 20 outputs a command for reducing the engine torque. On the other hand, for preventing the understeer condition, the braking-force control device 20 limits the engine torque in accordance with a permissible engine torque value calculated on the basis of a road-surface friction coefficient, and ground loads and lateral tire forces of the respective wheels. If it is detected that engine braking is in operation, the braking-force control device 20 adjusts the engine torque to substantially zero.

Consequently, the braking-force control device 20 is connected to an engine control unit 31, a transmission control unit 32, a road-surface friction coefficient estimating device 33 serving as road-surface friction coefficient estimator, wheel-speed sensors for the individual wheels (i.e. four wheel-speed sensors: left-front-wheel-speed sensor 34*fl*, right-front-wheel-speed sensor 34*fr*, left-rear-wheel-speed sensor 34*rl*, and right-rear-wheel-speed sensor 34*rr*), a steering-wheel-angle sensor 35, a yaw-rate sensor 36, and a lateral-acceleration sensor 37, and receives therefrom an engine torque $T_{eg}$, an engine speed $N_e$, a main transmission gear ratio i, a turbine speed $N_t$ of a torque converter, a road-surface friction coefficient μ, wheel speeds $\omega_{fl}$, $\omega_{fr}$, $\omega_{rl}$, and $\omega_{rr}$ of the four wheels, a steering-wheel angle θ, a yaw rate γ, and a lateral acceleration ($d^2y/dt^2$).

Figure 2:
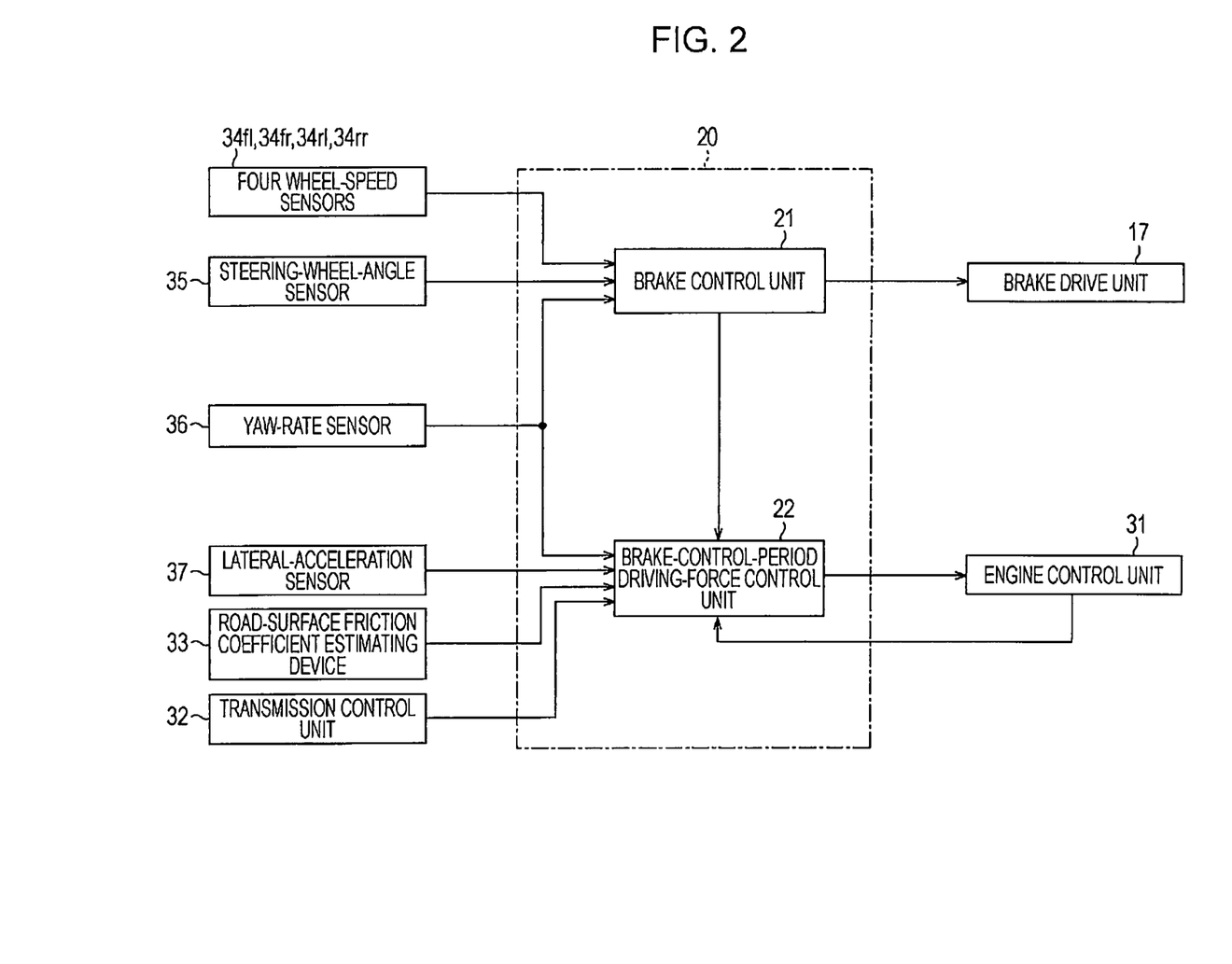
FIG. 2 is a functional block diagram of the braking-force control device.

Referring to FIG. 2, the braking-force control device 20 is mainly constituted by a brake control unit 21 and a brake-control-period driving-force control unit 22. The brake control unit 21 receives signals indicating the four wheel speeds $\omega_{fl}$, $\omega_{fr}$, $\omega_{rl}$, and $\omega_{rr}$ from the four respective wheel-speed sensors 34*fl*, 34*fr*, 34*rl*, and 34*rr*, a signal indicating the steering-wheel angle θ from the steering-wheel-angle sensor 35, and a signal indicating the yaw rate γ from the yaw-rate sensor 36.

As mentioned above, if it is detected that the vehicle 1 is in an oversteer condition during a turning operation on the basis of these input signals, the brake control unit 21 outputs a signal to the brake drive unit 17 so as to perform brake control on the front outside wheel. On the other hand, if it is detected that the vehicle 1 is in an understeer condition during a turning operation on the basis of these signals, the brake control unit 21 outputs a signal to the brake drive unit 17 so as to perform brake control on the rear inside wheel. A vehicle behavior signal detected as a result of this brake control, that is, a signal indicating that the vehicle 1 is in an oversteer condition or an understeer condition, is also output to the brake-control-period driving-force control unit 22. Accordingly, in this embodiment, the brake control unit 21 is provided as brake controller.

The brake-control-period driving-force control unit 22 receives signals indicating the engine torque $T_{eg}$, the engine speed $N_e$, the main transmission gear ratio i, the turbine speed $N_t$ of the torque converter, the road-surface friction coefficient μ, the yaw rate γ, the lateral acceleration ($d^2y/dt^2$), and the detected vehicle behavior from the engine control unit 31, the transmission control unit 32, the road-surface friction coefficient estimating device 33, the yaw-rate sensor 36, the lateral-acceleration sensor 37, and the brake control unit 21.

As mentioned above, the brake-control-period driving-force control unit 22 sends an output signal to the engine control unit 31 and outputs a command for reducing the engine torque in order to prevent an oversteer condition. On the other hand, for preventing an understeer condition, the brake-control-period driving-force control unit 22 limits the engine torque in accordance with a permissible engine torque value. If it is detected that engine braking is in operation, the brake-control-period driving-force control unit 22 adjusts the engine torque to substantially zero.

The configuration of the brake control unit 21 will be described below.

Figure 3:
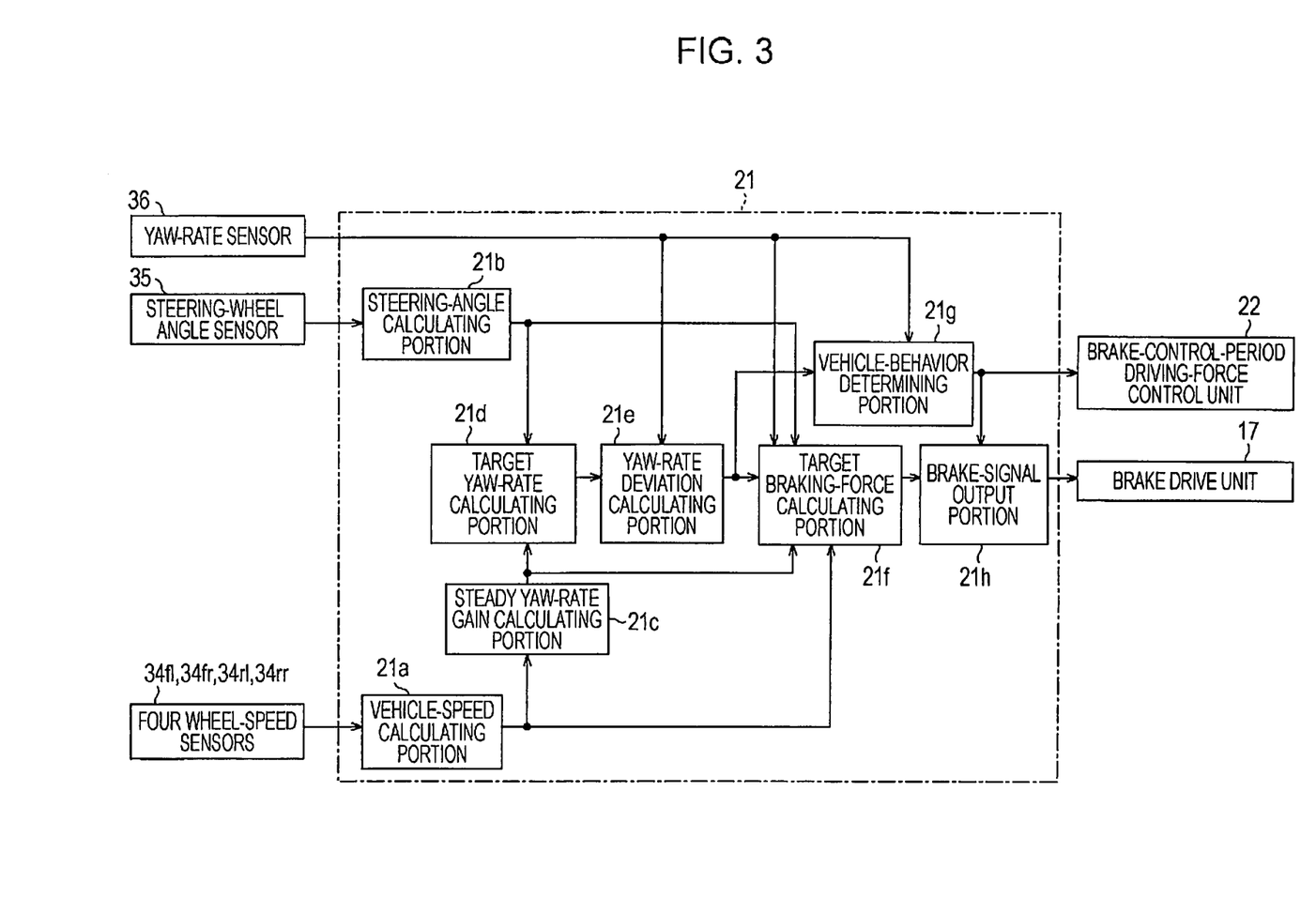
FIG. 3 is a functional block diagram of a brake control unit.

Referring to FIG. 3, the brake control unit 21 mainly includes a vehicle-speed calculating portion 21*a*, a steering-angle calculating portion 21*b*, a steady yaw-rate gain calculating portion 21*c*, a target yaw-rate calculating portion 21*d*, a yaw-rate deviation calculating portion 21*e*, a target braking-force calculating portion 21*f*, a vehicle-behavior determining portion 21*g*, and a brake-signal output portion 21*h*.

The vehicle-speed calculating portion 21*a* receives the signals indicating the four wheel speeds $\omega_{fl}$, $\omega_{fr}$, $\omega_{rl}$, and $\omega_{rr}$ from the four wheel-speed sensors 34*fl*, 34*fr*, 34*rl*, and 34*rr* and determines a vehicle speed V by performing calculation on these signals using a preliminarily set formula (for example, by calculating an average value of the four wheel speeds $\omega_{fl}$, $\omega_{fr}$, $\omega_{rl}$, and $\omega_{rr}$). The vehicle-speed calculating portion 21*a* then outputs the determined vehicle speed V to the steady yaw-rate gain calculating portion 21*c* and the target braking-force calculating portion 21*f*.

The steering-angle calculating portion 21*b* receives a signal from the steering-wheel-angle sensor 35 and divides the steering-wheel angle θ by a steering gear ratio N to determine an actual steering angle δf (=θ/N). The steering-angle calculating portion 21*b* then outputs the actual steering angle δf to the target yaw-rate calculating portion 21*d* and the target braking-force calculating portion 21*f*.

The steady yaw-rate gain calculating portion 21*c* receives the vehicle speed V from the vehicle-speed calculating portion 21*a* and uses, for example, the following expression (1) to determine a yaw rate value (steady yaw-rate gain Gγδf(0)) with respect to the actual steering angle δf at the time when the vehicle 1 is making a turn along a steady circle. The steady yaw-rate gain calculating portion 21*c* then outputs the determined yaw rate value to the target yaw-rate calculating portion 21*d* and the target braking-force calculating portion 21*f*.

$$G\gamma\delta f(0)=1/(1+A_0 \cdot V^2) \cdot V/L \tag{1}$$

Here, L indicates a wheel base and $A_0$ indicates a stability factor determined from the specifications of the vehicle.

The stability factor $A_0$ can be determined from the following expression (2):

$$A_0 = (-m \cdot (L_f \cdot CP_f L_r \cdot CP_r))/(2 \cdot L^2 \cdot CP_f CP_r) \quad (2)$$

where m indicates a vehicle mass, $L_f$ indicates a distance between the front axle and the center of mass, $L_r$ indicates a distance between the rear axle and the center of mass, $CP_f$ indicates equivalent cornering power of the front wheels, and $CP_r$ indicates equivalent cornering power of the rear wheels.

Based on the actual steering angle δf from the steering-angle calculating portion 21b and the steady yaw-rate gain Gγδf(0) from the steady yaw-rate gain calculating portion 21c, the target yaw-rate calculating portion 21d calculates a target yaw rate γ' from the following expression (3) in view of response delay of the vehicle. The target yaw-rate calculating portion 21d then outputs the target yaw rate γ' to the yaw-rate deviation calculating portion 21e.

$$\gamma' = 1/(1 + T \cdot s) \cdot G\gamma\delta f(0) \cdot \delta f \quad (3)$$

Here, T indicates a time constant, and s indicates a Laplace operator.

In other words, the expression (3) is an expression that expresses the response delay of the vehicle, expressed as a second-order system, as approximately a first order system. The time constant T can be obtained from, for example, the following expression (4):

$$T = (m \cdot L_f \cdot V)/(2 \cdot L \cdot CP_r) \quad (4)$$

The yaw-rate deviation calculating portion 21e receives the yaw rate γ from the yaw-rate sensor 36 and the target yaw rate γ' from the target yaw-rate calculating portion 21d. The yaw-rate deviation calculating portion 21e then subtracts the target yaw rate γ' from the yaw rate γ to determine a yaw-rate deviation Δγ (=γ−γ'), and outputs the yaw-rate deviation Δγ to the target braking-force calculating portion 21f and the vehicle-behavior determining portion 21g.

The target braking-force calculating portion 21f receives the yaw rate γ from the yaw-rate sensor 36, the vehicle speed V from the vehicle-speed calculating portion 21a, the actual steering angle δf from the steering-angle calculating portion 21b, the steady yaw-rate gain Gγδf(0) from the steady yaw-rate gain calculating portion 21c, and the yaw-rate deviation Δγ from the yaw-rate deviation calculating portion 21e. Using the following expressions (5) and (6), for example, the target braking-force calculating portion 21f calculates target braking forces (front-wheel target fluid pressure BF2f and rear-wheel target fluid pressure BF2r), and outputs the calculated target braking forces to the brake-signal output portion 21h.

$$BF2f = G1 \cdot (\Delta A \cdot 4 \cdot L^2 \cdot CP_f \cdot CP_r \cdot V)/((CP_f + CP_r) \cdot d_f \cdot \gamma) \quad (5)$$

$$BF2r = G1 \cdot (\Delta A \cdot 4 \cdot L^2 \cdot CP_f \cdot CP_r \cdot V)/((CP_f + CP_r) \cdot d_r \cdot \gamma) \quad (6)$$

Here, G1 indicates a gain, $d_f$ indicates a front tread, and $d_r$ indicates a rear tread. ΔA is determined from the following expression:

$$\Delta A = (\delta f/(G\gamma\delta f(0) \cdot \delta f + \Delta\gamma) - 1/G\gamma\delta f(0))/(L \cdot V) \quad (7)$$

Δγ in the above expression (7) may be a value that is corrected in view of a skid angle β.

The vehicle-behavior determining portion 21g receives the yaw rate γ from the yaw-rate sensor 36 and the yaw-rate deviation Δγ from the yaw-rate deviation calculating portion 21e. The vehicle-behavior determining portion 21g is provided as vehicle-behavior detector for detecting whether the vehicle 1 is in an oversteer condition, an understeer condition, or other conditions based on a combination of the signs of the yaw rate γ and the yaw-rate deviation Δγ. The detection result of the vehicle behavior is output to the brake-control-period driving-force control unit 22. In this embodiment, the detection result is output as a vehicle-behavior determination flag F. Based on the detection result of the vehicle behavior, a brake wheel is selected.

Figure 8:
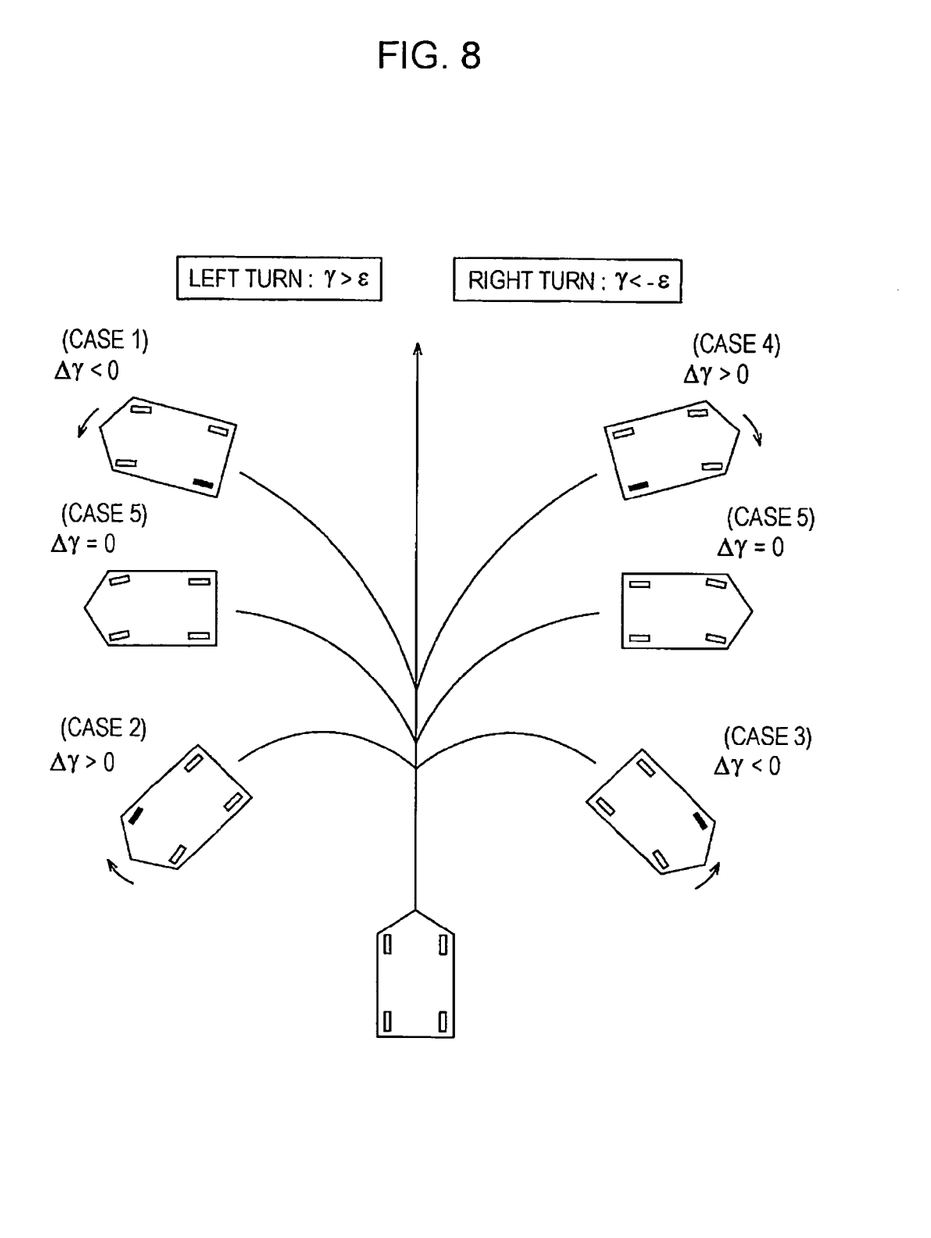
FIG. 8 illustrates wheels that receive braking forces as a result of brake control.

In detail, referring to FIG. 8, the vehicle-behavior determining portion 21g has set therein the following combinations. Regarding the signs of the yaw rate γ and the target yaw rate γ', a left turning direction of the vehicle is given a positive (+) sign whereas a right turning direction of the vehicle is given a negative (−) sign. In the description below, ϵ is a preliminarily set positive (+) value that is close to zero.

Case 1: γ>ϵ, Δγ<0

When the vehicle 1 is in an understeer condition (vehicle-behavior determination flag F=2) with respect to the target yaw rate γ' under a left turning mode, a brake is applied to the left rear wheel.

Case 2: γ>ϵ, Δγ>0

When the vehicle 1 is in an oversteer condition (vehicle-behavior determination flag F=1) with respect to the target yaw rate γ= under a left turning mode, a brake is applied to the right front wheel.

Case 3: γ<−ϵ, Δγ<0

When the vehicle 1 is in an oversteer condition (vehicle-behavior determination flag F=1) with respect to the target yaw rate γ' under a right turning mode, a brake is applied to the left front wheel.

Case 4: γ<−ϵ, Δγ>0

When the vehicle 1 is in an understeer condition (vehicle-behavior determination flag F=2) with respect to the target yaw rate γ' under a right turning mode, a brake is applied to the right rear wheel.

Case 5: When ϵ≥γ≥−ϵ or Δγ=0 (vehicle-behavior determination flag F=0), a brake wheel is not selected and a braking operation is not implemented.

In the driving mode (substantially straight driving mode) of Case 5 indicated by ϵ≥γ≥−ϵ, a brake wheel is not selected and a braking operation is not implemented. With regard to other yaw rates γ, the rear inside wheel is selected as a brake wheel if the vehicle is in an understeer condition where the yaw rate γ and the yaw-rate deviation Δγ have different signs. On the other hand, in an oversteer condition where the yaw rate γ and the yaw-rate deviation Δγ have the same sign, the front outside wheel is selected as a brake wheel.

The brake-signal output portion 21h receives the target braking forces BF2f and BF2r from the target braking-force calculating portion 21f and also receives the brake-wheel selection result based on the detection result of the vehicle behavior from the vehicle-behavior determining portion 21g. The brake-signal output portion 21h then outputs a signal to the brake drive unit 17 so that the brake drive unit 17 applies the front-wheel target fluid pressure BF2f or the rear-wheel target fluid pressure BF2r calculated by the target braking-force calculating portion 21f to the brake wheel selected at the vehicle-behavior determining portion 21g.

The configuration of the brake-control-period driving-force control unit 22 will be described below.

Figure 4:
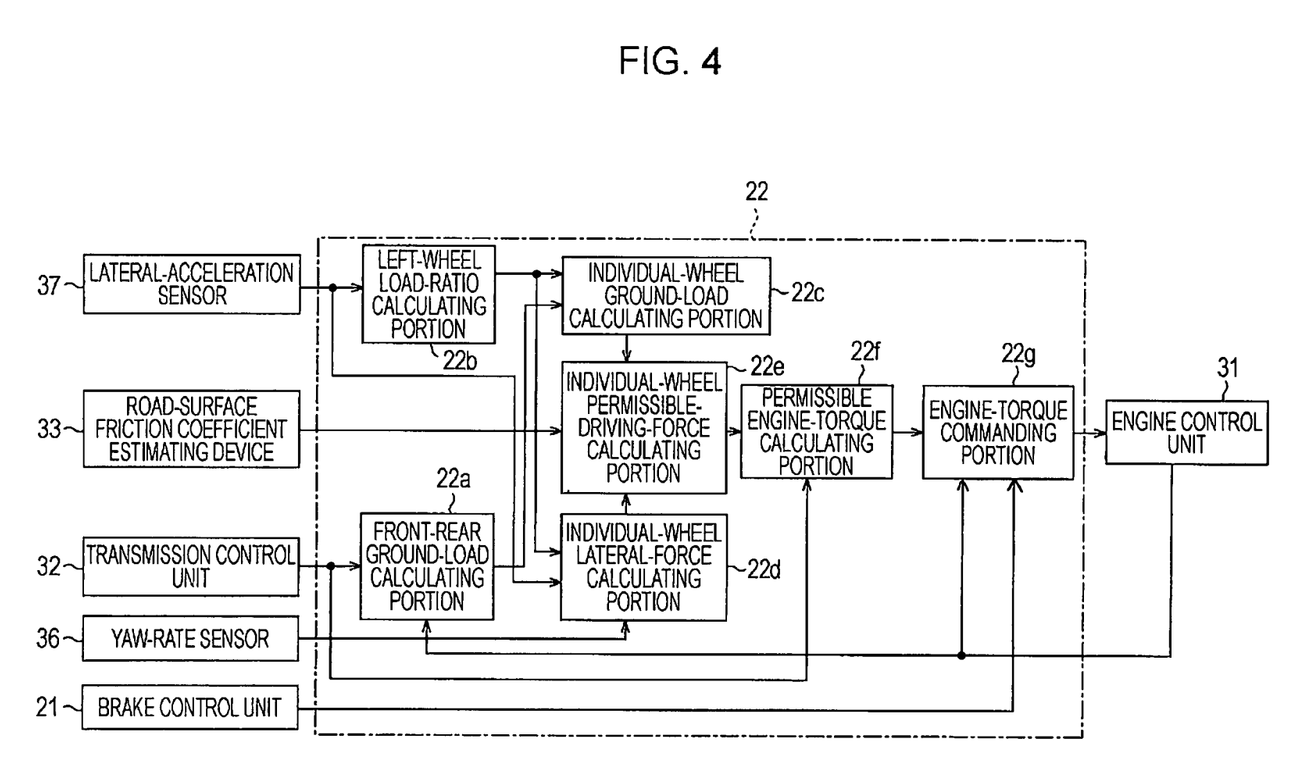
FIG. 4 is a functional block diagram of a brake-control-period driving-force control unit.

Referring to FIG. 4, the brake-control-period driving-force control unit 22 mainly includes a front-rear ground-load calculating portion 22a, a left-wheel load-ratio calculating portion 22b, an individual-wheel ground-load calculating portion 22c, an individual-wheel lateral-force calculating portion 22d, an individual-wheel permissible-driving-force calculating portion 22e, a permissible engine-torque calculating portion 22f, and an engine-torque commanding portion 22g.

The front-rear ground-load calculating portion 22a receives the engine torque $T_{eg}$ and the engine speed $N_e$ from the engine control unit 31, and also receives the main transmission gear ratio i and the turbine speed $N_t$ of the torque converter from the transmission control unit 32.

The front-rear ground-load calculating portion 22a calculates a front-wheel ground load $F_{zf}$ from the following expression (8) and a rear-wheel ground load $F_{zr}$ from the following expression (9), and outputs the calculated values to the individual-wheel ground-load calculating portion 22c.

$$F_{zf} = W_f - ((m \cdot A_x \cdot h)/L) \tag{8}$$

$$F_{zr} = W - F_{zf} \tag{9}$$

Here, $W_f$ indicates a front-wheel static load, h indicates the height of the center of mass, W indicates the weight of the vehicle (=m·G; G being gravitational acceleration), and $A_x$ indicates a longitudinal acceleration (=$F_x$/m).

$F_x$ in the arithmetic expression for determining the longitudinal acceleration $A_x$ indicates a total driving force, which can be calculated from, for example, the following expression (10):

$$F_x = T_t \cdot \eta \cdot i_f / R_t \tag{10}$$

where η indicates a transmission efficiency of a driving system, $i_f$ indicates a final gear ratio, and $R_t$ indicates a tire radius. Furthermore, $T_t$ indicates a transmission output torque, which can be calculated from the following expression (11):

$$T_t = T_{eg} \cdot t \cdot i \tag{11}$$

where t indicates a torque ratio of the torque converter, which is determined by referring to a preliminarily set map that shows a relationship between a rotational velocity ratio e (=$N_t/N_e$) of the torque converter and a torque ratio of the torque converter.

The left-wheel load-ratio calculating portion 22b receives the lateral acceleration ($d^2y/dt^2$) from the lateral-acceleration sensor 37. The left-wheel load-ratio calculating portion 22b then calculates a left-wheel load-ratio $WR\_l$ from the following expression (12) and outputs the calculated left-wheel load-ratio $WR\_l$ to the individual-wheel ground-load calculating portion 22c and the individual-wheel lateral-force calculating portion 22d.

$$WR\_l = 0.5 - ((d^2y/dt^2)/G) \cdot (h/L_{tred}) \tag{12}$$

Here, $L_{tred}$ indicates an average tread value between the front and rear wheels.

The individual-wheel ground-load calculating portion 22c receives the front-wheel ground load $F_{zf}$ and the rear-wheel ground load $F_{zr}$ from the front-rear ground-load calculating portion 22a, and also receives the left-wheel load-ratio $WR\_l$ from the left-wheel load-ratio calculating portion 22b. The individual-wheel ground-load calculating portion 22c calculates a left-front-wheel ground load $F_{zf\_l}$, a right-front-wheel ground load $F_{zf\_r}$, a left-rear-wheel ground load $F_{zr\_l}$, and a right-rear-wheel ground load $F_{zr\_r}$ from the following expressions (13) to (16), respectively, and outputs these calculated values to the individual-wheel permissible-driving-force calculating portion 22e. In other words, the individual-wheel ground-load calculating portion 22c is provided as ground-load estimator.

$$F_{zf\_l} = F_{zf} \cdot WR\_l \tag{13}$$

$$F_{zf\_r} = F_{zf} \cdot (1 - WR\_l) \tag{14}$$

$$F_{zr\_l} = F_{zr} \cdot WR\_l \tag{15}$$

$$F_{zr\_r} = F_{zr} \cdot (1 - WR\_l) \tag{16}$$

The individual-wheel lateral-force calculating portion 22d receives the lateral acceleration ($d^2y/dt^2$) from the lateral-acceleration sensor 37, the yaw rate γ from the yaw-rate sensor 36, and the left-wheel load-ratio $WR\_l$ from the left-wheel load-ratio calculating portion 22b. The individual-wheel lateral-force calculating portion 22d then calculates a front-wheel lateral force $F_{yf}$ from the following expression (17) and a rear-wheel lateral force $F_{yr}$ from the following expression (18). Based on the front-wheel lateral force $F_{yf}$ and the rear-wheel lateral force $F_{yr}$, the individual-wheel lateral-force calculating portion 22d calculates a left-front-wheel lateral force $F_{yf\_l}$, a right-front-wheel lateral force $F_{yf\_r}$, a left-rear-wheel lateral force $F_{yr\_l}$, and a right-rear-wheel lateral force $F_{yr\_r}$ from the following expressions (19) to (22), and outputs these calculated values to the individual-wheel permissible-driving-force calculating portion 22e. In other words, the individual-wheel lateral-force calculating portion 22d is provided as lateral-tire-force estimator.

$$F_{yf} = (I_z \cdot (d\gamma/dt) + m \cdot (d^2y/dt^2) \cdot L_r)/L \tag{17}$$

$$F_{yr} = (-I_z \cdot (d\gamma/dt) + m \cdot (d^2y/dt^2) \cdot L_f)/L \tag{18}$$

Here, $I_z$ indicates a yaw moment of inertia of the vehicle.

$$F_{yf\_l} = F_{yf} \cdot WR\_l \tag{19}$$

$$F_{yf\_r} = F_{yf} \cdot (1 - WR\_l) \tag{20}$$

$$F_{yr\_l} = F_{yr} \cdot WR\_l \tag{21}$$

$$F_{yr\_r} = F_{yr} \cdot (1 - WR\_l) \tag{22}$$

The individual-wheel permissible-driving-force calculating portion 22e receives the road-surface friction coefficient μ from the road-surface friction coefficient estimating device 33, receives the left-front-wheel ground load $F_{zf\_l}$, the right-front-wheel ground load $F_{zf\_r}$, the left-rear-wheel ground load $F_{zr\_l}$, and the right-rear-wheel ground load $F_{zr\_r}$ from the individual-wheel ground-load calculating portion 22c, and also receives the left-front-wheel lateral force $F_{yf\_l}$, the right-front-wheel lateral force $F_{yf\_r}$, the left-rear-wheel lateral force $F_{yr\_l}$, and the right-rear-wheel lateral force $F_{yr\_r}$ from the individual-wheel lateral-force calculating portion 22d. Then, based on the following expressions (23) to (26), the individual-wheel permissible-driving-force calculating portion 22e calculates front-rear permissible driving forces of the respective wheels as a left-front-wheel permissible driving force $F_{x0f\_l}$, a right-front-wheel permissible driving force $F_{x0f\_r}$, a left-rear-wheel permissible driving force $F_{x0r\_l}$, and a right-rear-wheel permissible driving force $F_{x0r\_r}$. The individual-wheel permissible-driving-force calculating portion 22e then outputs these calculated values to the permissible engine-torque calculating portion 22f.

$$F_{x0f\_l} = ((\mu \cdot F_{zf\_l})^2 - F_{yf\_l}^2)^{1/2} \tag{23}$$

$$F_{x0f\_r} = ((\mu \cdot F_{zf\_r})^2 - F_{yf\_r}^2)^{1/2} \tag{24}$$

$$F_{x0r\_l} = ((\mu \cdot F_{zr\_l})^2 - F_{yr\_l}^2)^{1/2} \tag{25}$$

$$F_{x0r\_r} = ((\mu \cdot F_{zr\_r})^2 - F_{yr\_r}^2)^{1/2} \tag{26}$$

The permissible engine-torque calculating portion 22f receives the main transmission gear ratio i from the transmission control unit 32, and also receives the left-front-wheel permissible driving force $F_{x0f\_l}$, the right-front-wheel permissible driving force $F_{x0f\_r}$, the left-rear-wheel permissible driving force $F_{x0r\_l}$, and the right-rear-wheel permissible driving force $F_{x0r\_r}$ from the individual-wheel permissible-driving-force calculating portion 22e. The permissible engine-torque calculating portion 22f then calculates a permissible engine torque $T_{EG0}$ from the following expression (27), and outputs the calculated permissible engine torque $T_{EG0}$ to the engine-torque commanding portion 22g. In other words, the individual-wheel permissible-driving-force calculating portion 22e and the permissible engine-torque calculating portion 22f are provided as permissible-engine-torque calculator.

$$T_{EG0}=((F_{x0f\_l}+F_{x0f\_r}+F_{x0r\_l}+F_{x0r\_r})\cdot R_t)/(i_f\cdot i) \quad (27)$$

The engine-torque commanding portion 22g receives the engine torque $T_{eg}$ from the engine control unit 31, the detection result of the vehicle behavior from the brake control unit 21 (i.e. a vehicle-behavior determination flag F in this embodiment), and the permissible engine torque $T_{EG0}$ from the permissible engine-torque calculating portion 22f. The engine-torque commanding portion 22g outputs a command for reducing the engine torque $T_{eg}$ (specifically, to a preliminarily set engine torque value such as "0") to the engine control unit 31 if the vehicle 1 is in an oversteer condition (vehicle-behavior determination flag F=1), or outputs a command for limiting the engine torque $T_{eg}$ to an amount lower than or equal to the permissible engine torque $T_{EG0}$ to the engine control unit 31 if the vehicle 1 is in an understeer condition (vehicle-behavior determination flag F=2). On the other hand, if it is determined that the engine torque $T_{eg}$ is below zero and engine braking is in operation, the engine-torque commanding portion 22g outputs a command for adjusting the engine torque $T_{eg}$ to substantially zero. Other alternative methods for adjusting the engine torque $T_{eg}$ to substantially zero include outputting a signal to the transmission control unit 32 for an upshift or setting the gear stage to neutral. In other words, the engine-torque commanding portion 22g is provided as engine-torque controller.

Figure 5:
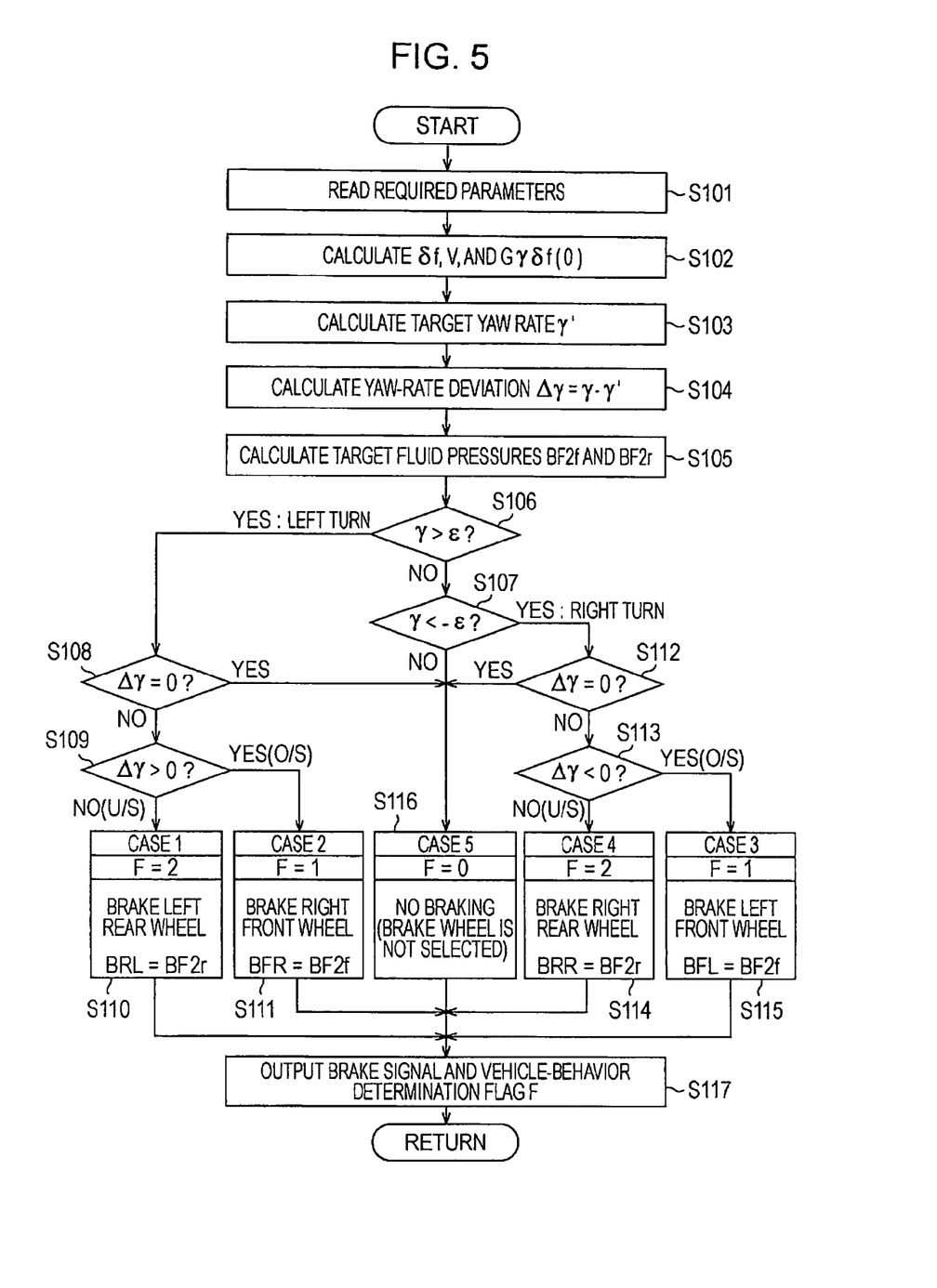
FIG. 5 is a flow chart of a brake control program.
Figure 6:
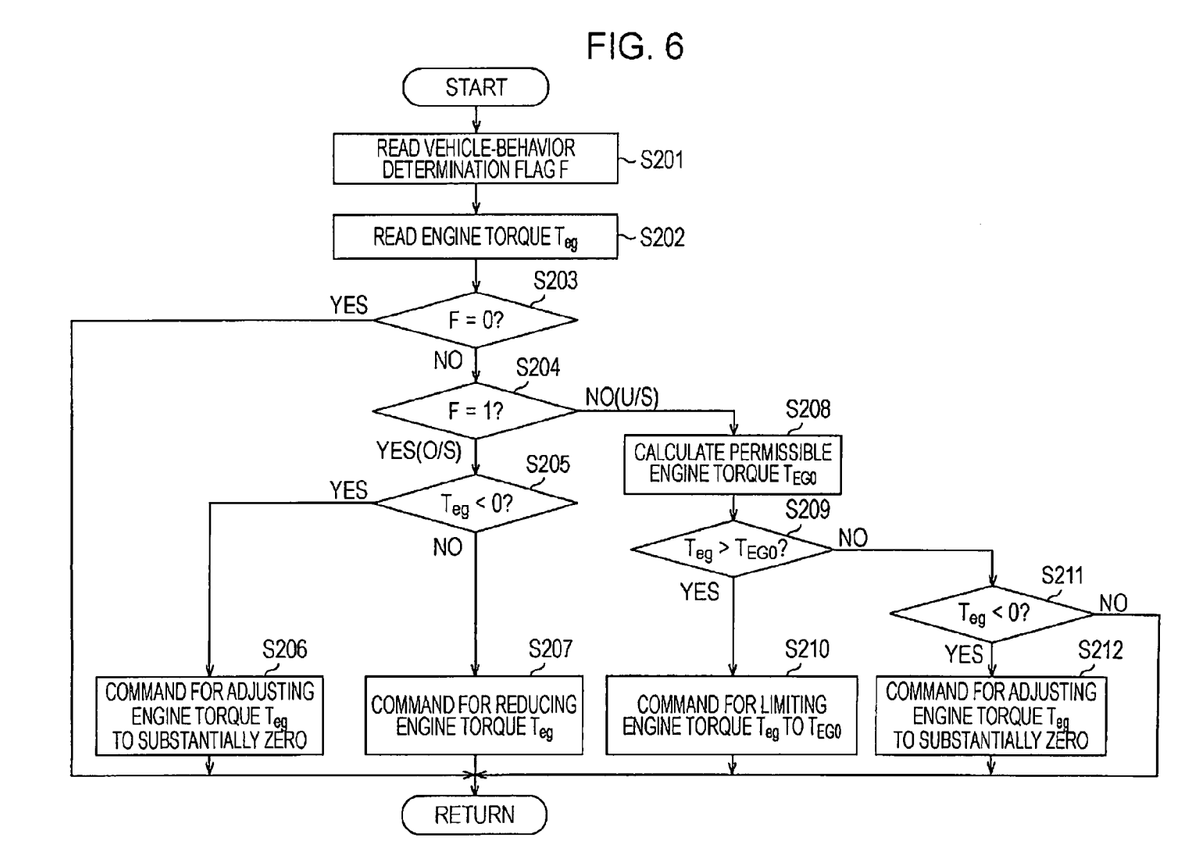
FIG. 6 is a flow chart of a brake-control-period driving-force control program.
Figure 7:
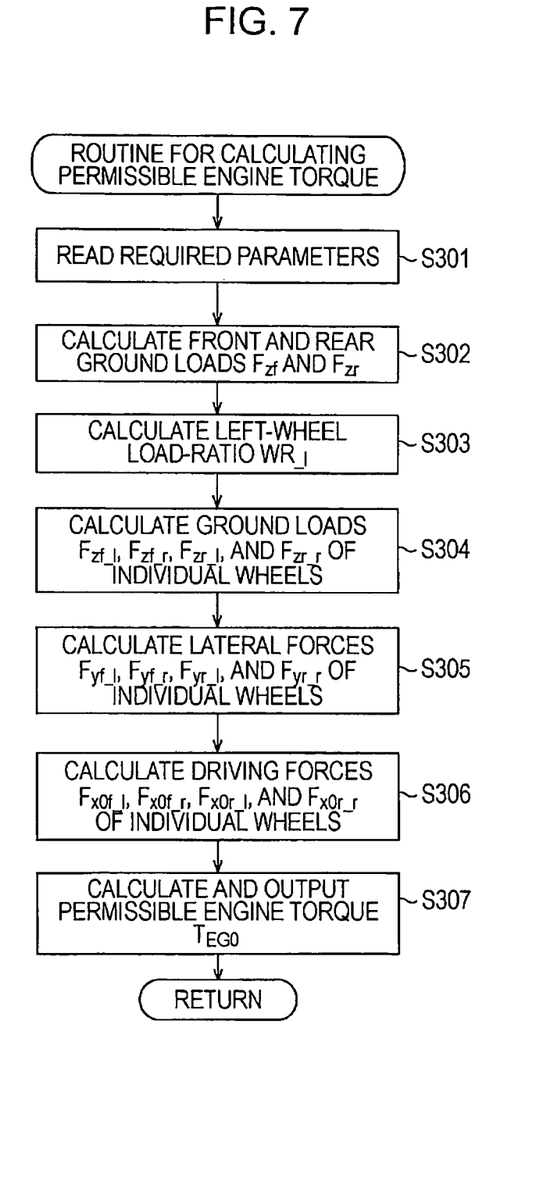
FIG. 7 is a flow chart of a routine for calculating a permissible engine torque.

The control operations performed in the brake control unit 21 and the brake-control-period driving-force control unit 22 of the braking-force control device 20 will now be described with reference to the flow charts in FIGS. 5 to 7.

First, a brake control program performed in the brake control unit 21 will be described with reference to the flow chart in FIG. 5.

In step S101, required parameters are read, which include a steering-wheel angle θ, wheel speeds $\omega_{fl}$, $\omega_{fr}$, $\omega_{rl}$, and $\omega_{rr}$ of the four individual wheels, and a yaw rate γ.

In step S102, the vehicle-speed calculating portion 21a calculates a vehicle speed V, the steering-angle calculating portion 21b calculates an actual steering angle δf, and the steady yaw-rate gain calculating portion 21c calculates a steady yaw-rate gain Gγδf(0) from the aforementioned expression (1).

In step S103, the target yaw-rate calculating portion 21d calculates a target yaw rate γ' from the aforementioned expression (3). In step S104, the yaw-rate deviation calculating portion 21e calculates a yaw-rate deviation Δγ (=γ−γ'). In step S105, the target braking-force calculating portion 21f calculates a front-wheel target fluid pressure BF2f and a rear-wheel target fluid pressure BF2r on the basis of the aforementioned expressions (5) and (6). The process then proceeds to step S106.

Steps S106 to S116 to be described below are mainly performed by the vehicle-behavior determining portion 21g. In step S106, it is determined whether or not the yaw rate γ is greater than ε. In other words, it is determined whether the vehicle 1 is turning left by a relatively large degree. If the yaw rate γ is lower than or equal to ε, the process proceeds to step S107 where it is determined whether the yaw rate γ is lower than −ε. In other words, it is determined in step S107 whether the vehicle 1 is turning right by a relatively large degree. In step S107, within a range (ε≥γ≥−ε) of the yaw rate γ in which the vehicle 1 is determined to be not turning right by a relatively large degree, the vehicle 1 is in a substantially straight driving mode. Therefore, the process proceeds to step S116 where the vehicle-behavior determination flag F is set to "0", and a brake wheel is not selected and a braking operation is not implemented.

On the other hand, if γ>ε in step S106 and the vehicle 1 is determined to be turning left by a relatively large degree, the process proceeds to step S108 where it is determined whether or not the yaw-rate deviation Δγ is zero (Δγ=0). If Δγ=0, the process proceeds to step S116, whereas if Δγ≠0, the process proceeds to step S109.

In step S109, the sign of the yaw-rate deviation Δγ is determined. If the yaw-rate deviation Δγ has a negative sign that differs from that of the yaw rate γ, the vehicle 1 is in an understeer condition with respect to the target yaw rate γ'. Therefore, the process proceeds to step S110 where the vehicle-behavior determination flag F is set to "2" and the left rear wheel 12rl is selected as a brake wheel to be braked with the rear-wheel target fluid pressure BF2r determined in step S105 (left-rear-wheel fluid pressure BRL=BF2r).

If the yaw-rate deviation Δγ has a positive sign in step S109, which is the same as that of the actual yaw rate γ, the vehicle 1 is in an oversteer condition with respect to the target yaw rate γ'. Therefore, the process proceeds to step S111 where the vehicle-behavior determination flag F is set to "1" and the right front wheel 12fr is selected as a brake wheel to be braked with the front-wheel target fluid pressure BF2f determined in step S105 (right-front-wheel fluid pressure BFR=BF2f).

On the other hand, if γ<−ε in step S107 and the vehicle 1 is determined to be turning right by a relatively large degree, the process proceeds to step S112 where it is determined whether or not the yaw-rate deviation Δγ is zero (Δγ=0). If Δγ=0, the process proceeds to step S116, whereas if Δγ≠0, the process proceeds to step S113.

In step S113, the sign of the yaw-rate deviation Δγ is determined. If the yaw-rate deviation Δγ has a position sign that differs from that of the yaw rate γ, the vehicle 1 is in an understeer condition with respect to the target yaw rate γ'. Therefore, the process proceeds to step S114 where the vehicle-behavior determination flag F is set to "2" and the right rear wheel 12rr is selected as a brake wheel to be braked with the rear-wheel target fluid pressure BF2r determined in step S105 (right-rear-wheel fluid pressure BRR=BF2r).

If the yaw-rate deviation Δγ has a negative sign in step S113, which is the same as that of the yaw rate γ, the vehicle 1 is in an oversteer condition with respect to the target yaw rate γ'. Therefore, the process proceeds to step S115 where the vehicle-behavior determination flag F is set to "1" and the left front wheel 12fl is selected as a brake wheel to be braked with the front-wheel target fluid pressure BF2f determined in step S105 (left-front-wheel fluid pressure BFL=BF2f).

On the other hand, when the process proceeds from step S107, S108, or S112 to step S116, the vehicle-behavior determination flag F is set to "0", and a brake wheel is not selected and a braking operation is not implemented.

Upon completion of step S110, S111, S114, S115, or S116, the process proceeds to step S117 where the brake-signal output portion 21h outputs a signal to the brake drive unit 17 and the vehicle-behavior determining portion 21g outputs the corresponding vehicle-behavior determination flag F to the brake-control-period driving-force control unit 22. Finally, the process exits the program.

A brake-control-period driving-force control program performed in the brake-control-period driving-force control unit 22 will now be described with reference to the flow chart in FIG. 6.

First, in step S201, the vehicle-behavior determination flag F is read from the brake control unit 21. In step S202, the engine torque $T_{eg}$ is read from the engine control unit 31.

In step S203, it is determined whether or not the vehicle-behavior determination flag F is "0" (whether or not the vehicle 1 is in a straight driving mode or neutral steering mode). If F=0, the process directly exits the program.

If F≠0 as a result of the determination in step S203, the process proceeds to step S204 where it is determined whether or not F=1 (whether the vehicle behavior is in an oversteer condition). If F=1 (oversteer condition), the process proceeds to step S205.

In step S205, it is determined whether or not the engine torque $T_{eg}$ is below zero, namely, whether or not engine braking is in operation. If it is determined that $T_{eg}<0$ (i.e. engine braking is in operation), the process proceeds to step S206 where a command for adjusting the engine torque $T_{eg}$ to substantially zero (i.e. a command for cancelling the operation of engine braking) is output to the engine control unit 31. The process then exits the program.

If it is determined that $T_{eg} \geq 0$ (i.e. that engine braking is not in operation) as a result of the determination in step S205, the process proceeds to step S207 where a command for reducing the engine torque $T_{eg}$ (specifically, to a preliminarily set engine torque value such as "0") is output to the engine control unit 31. The process then exits the program.

On the other hand, if F≠1 as a result of the determination in step S204, that is, if F=2 (understeer condition), the process proceeds to step S208 where a permissible engine torque $T_{EG0}$ is calculated in accordance with a routine for calculating a permissible engine torque $T_{EG0}$ to be described hereinafter. The process then proceeds to step S209 where the engine torque $T_{eg}$ and the permissible engine torque $T_{EG0}$ are compared.

If $T_{eg} \geq T_{EG0}$ as a result of the comparison in step S209, the process proceeds to step S210 where a command for limiting the engine torque $T_{eg}$ to the permissible engine torque $T_{EG0}$ is output to the engine control unit 31 so as to maintain the tire grip performance. The process then exits the program.

If $T_{eg} \leq T_{EG0}$ as a result of the comparison in step S209, the process proceeds to step S211 where it is determined whether or not the engine torque $T_{eg}$ is below zero, as in step S205. In other words, it is determined in step S211 whether or not engine braking is in operation. If it is determined that $T_{eg}<0$ (i.e. engine braking is in operation), the process proceeds to step S212 where a command for adjusting the engine torque $T_{eg}$ to substantially zero (i.e. a command for cancelling the operation of engine braking) is output to the engine control unit 31. The process then exits the program.

If it is determined that $T_{eg} \geq 0$ (i.e. that engine braking is not in operation) as a result of the determination in step S211, the process exits the program.

In this embodiment, the control for cancelling the operation of engine braking in step S206 and step S212 is implemented by outputting a command for adjusting the engine torque $T_{eg}$ to substantially zero to the engine control unit 31. Alternatively, the control may be implemented by outputting a signal to the transmission control unit 32 for an upshift or setting the gear stage to neutral.

The aforementioned routine performed in step S208 for calculating a permissible engine torque $T_{EG0}$ will now be described with reference to the flow chart in FIG. 7.

First, in step S301, required parameters are read, which include signals indicating the engine torque $T_{eg}$, the engine speed $N_e$, the main transmission gear ratio i, the turbine speed $N_t$ of the torque converter, the road-surface friction coefficient μ, the lateral acceleration ($d^2y/dt^2$), and the yaw rate γ.

In step S302, the front-rear ground-load calculating portion 22a calculates a front-wheel ground load $F_{zf}$ and a rear-wheel ground load $F_{zr}$ from the aforementioned expressions (8) and (9), respectively.

In step S303, the left-wheel load-ratio calculating portion 22b calculates a left-wheel load-ratio $WR_{\_l}$ from the aforementioned expression (12).

In step S304, the individual-wheel ground-load calculating portion 22c calculates a left-front-wheel ground load $F_{zf\_l}$, a right-front-wheel ground load $F_{zf\_r}$, a left-rear-wheel ground load $F_{zr\_l}$, and a right-rear-wheel ground load $F_{zr\_r}$ from the aforementioned expressions (13) to (16), respectively.

In step S305, the individual-wheel lateral-force calculating portion 22d calculates a left-front-wheel lateral force $F_{yf\_l}$, a right-front-wheel lateral force $F_{yf\_r}$, a left-rear-wheel lateral force $F_{yr\_l}$, and a right-rear-wheel lateral force $F_{yr\_r}$ from the aforementioned expressions (19) to (22), respectively.

In step S306, the individual-wheel permissible-driving-force calculating portion 22e calculates a left-front-wheel permissible driving force $F_{x0f\_l}$, a right-front-wheel permissible driving force $F_{x0f\_r}$, a left-rear-wheel permissible driving force $F_{x0r\_l}$, and a right-rear-wheel permissible driving force $F_{x0r\_r}$ from the aforementioned expressions (23) to (26), respectively.

In step S307, the permissible engine-torque calculating portion 22f calculates a permissible engine torque $T_{EG0}$ from the aforementioned expression (27) and outputs the calculated permissible engine torque $T_{EG0}$ to the engine-torque commanding portion 22g. Finally, the process exits the routine.

Accordingly, this embodiment of the present invention has a brake control function for performing brake control on the front outside wheel when the vehicle 1 is detected to be in an oversteer condition during a turning operation and for performing brake control on the rear inside wheel when the vehicle 1 is detected to be in an understeer condition during a turning operation. For preventing the oversteer condition, a command for reducing the engine torque is output. On the other hand, for preventing the understeer condition, the engine torque is limited in accordance with a permissible engine torque value that is calculated on the basis of a road-surface friction coefficient, and ground loads and lateral tire forces of the respective wheels. If it is detected that engine braking is in operation, the engine torque is adjusted to substantially zero.

Accordingly, when the vehicle 1 is undergoing the control for preventing an oversteer condition, the stability of the vehicle behavior is sufficiently attained by means of the braking of the outside wheel, whereby unstable vehicle behavior caused by engine braking can be prevented.

On the other hand, when the vehicle 1 is undergoing the control for preventing an understeer condition, an engine torque is permitted within a range in which tire grip forces are not lost. Consequently, while the effect of enhancing the turning performance of the vehicle by application of a braking force to the inside wheel is maintained, vehicle behavior that reflects the driver's intention for acceleration can be attained. In addition, since the rear inside wheel undergoes engine braking and receives a braking force at the same time, unstable vehicle behavior can also be prevented.

The configuration of the brake control unit 21 in this embodiment is only an example, and therefore, the use of a brake control unit having a different configuration is also permissible.

Furthermore, although the brake-control-period driving-force control unit 22 in this embodiment is configured to correspond to both the oversteer-condition prevention control and the understeer-condition prevention control performed by the brake control unit 21, the brake-control-period driving-force control unit 22 may alternatively be configured to correspond to only one of the two kinds of control.

What is claimed is:

1. A vehicle braking-force control device comprising:
   a road-surface friction coefficient estimator configured to estimate a road-surface friction coefficient;
   a ground-load estimator configured to estimate ground loads acting on individual wheels;
   a lateral-tire-force estimator configured to estimate lateral tire forces acting on the individual wheels;
   a vehicle-behavior detector configured to detect whether a vehicle is running in an understeer condition or an oversteer condition;
   a permissible-engine-torque calculator configured to calculate a permissible engine torque on the basis of the road-surface friction coefficient, the ground loads of the individual wheels, and the lateral tire forces of the individual wheels when an understeer condition is detected;
   a brake controller configured to perform brake control on an inside turning wheel when the understeer condition is detected; and
   an engine-torque controller configured to control an engine torque such that;
      in an understeer condition detected when the brake controller performs a brake control, and when an operation of engine braking is not detected, the engine-torque controller reduces the engine torque in accord with a parameter that is based on the permissible engine torque, and
      in an understeer condition detected when the brake controller performs a brake control, and when an operation of engine braking is detected, the engine-torque controller increases the engine torque to substantially zero.

2. The vehicle braking-force control device according to claim 1, wherein,
   the brake controller is configured to perform brake control on an outside turning wheel when the oversteer condition is detected; and
   the engine-torque controller is configured to control the engine torque such that:
      in an oversteer condition detected when the brake controller performs a brake control, and when an operation of engine braking is not detected, the engine-torque controller reduces the engine torque to an amount lower than that of a current engine torque.

3. The vehicle braking-force control device according to claim 1, wherein the brake controller is further configured to perform brake control on a rear inside turning wheel when the understeer condition is detected.

4. The vehicle braking-force control device according to claim 1, wherein the brake controller is further configured to perform brake control on a front outside turning wheel when the oversteer condition is detected.

5. The vehicle braking-force control device according to claim 1, wherein the permissible engine torque calculated by the permissible engine-torque calculator is a preliminarily set engine torque value.

6. The vehicle braking-force control device according to claim 1, wherein
   the brake controller is further configured to perform brake control on an outside turning wheel when the oversteer condition is detected; and
   the engine-torque controller is further configured to control an engine torque such that:
      in an oversteer condition detected when the brake controller performs a brake control, and when an operation of engine braking is not detected, the engine-torque controller sets the engine torque to a pre-set engine torque value, and
      in an oversteer condition detected when the brake controller performs a brake control, and when an operation of engine braking is detected, the engine-torque controller increases the engine torque to substantially zero.

7. A vehicle braking-force control device comprising:
   a road-surface friction coefficient estimator configured to estimate a road-surface friction coefficient;
   a ground-load estimator configured to estimate ground loads acting on individual wheels;
   a lateral-tire-force estimator configured to estimate lateral tire forces acting on the individual wheels;
   a permissible-engine-torque calculator configured to calculate a permissible engine torque on the basis of the road-surface friction coefficient, the ground loads of the individual wheels, and the lateral tire forces of the individual wheels;
   a vehicle-behavior detector configured to detect whether a vehicle is running in an oversteer condition or an understeer condition;
   a brake controller configured to perform brake control on an outside turning wheel when the oversteer condition is detected, and to perform brake control on an inside turning wheel when the understeer condition is detected; and
   an engine-torque controller configured to control an engine torque such that:
      if an oversteer condition is detected, when the brake controller performs a brake control, and an operation of engine braking is not detected, the engine-torque controller sets the engine torque to a pre-set engine torque value,
      if an understeer condition is detected, when the brake controller performs a brake control, and a current-engine torque is higher than the calculated permissible engine torque, the engine-torque controller reduces the engine torque to the calculated permissible engine torque,
      if an understeer condition is detected, when the brake controller performs a brake control, and a current-engine torque is less than or equal to the calculated permissible engine torque, and an operation of engine braking is not detected, the engine-torque controller will not perform an engine torque control, and
      if an operation of engine braking is detected, when the brake controller performs a brake control, the engine-torque controller increases the engine torque to substantially zero.

8. The vehicle braking-force control device according to claim 7, wherein the brake controller is further configured to perform a brake control on a front outside turning wheel when the oversteer condition is detected.

9. The vehicle braking-force control device according to claim 7, wherein the brake controller is further configured to perform a brake control on a rear inside turning wheel when the understeer condition is detected.

10. The vehicle braking-force control device according to claim 7, wherein the permissible engine torque calculated by the permissible engine-torque calculator is an above zero engine torque value that is within a range that is determined to prevent a loss of tire grip forces.

11. The vehicle braking-force control device according to claim 10, wherein the engine-torque controller is configured such that, if the running condition detected by the vehicle-behavior detector is an oversteer condition, and an operation of engine braking is not detected, the engine-torque controller reduces an engine torque to an amount lower than that of a current engine torque.

12. A vehicle braking-force control device comprising:
- a road-surface friction coefficient estimator configured to estimate a road-surface friction coefficient;
- a ground-load estimator configured to estimate ground loads acting on individual wheels;
- a lateral-tire-force estimator configured to estimate lateral tire forces acting on the individual wheels;
- a permissible-engine-torque calculator configured to calculate a permissible engine torque on the basis of the road-surface friction coefficient, the ground loads of the individual wheels, and the lateral tire forces of the individual wheels;
- a vehicle-behavior detector configured to detect a running condition of the vehicle;
- a brake controller configured to perform brake control selectively on one or more wheels of the vehicle, based on the detected running condition of the vehicle, during a turning operation of the vehicle; and
- an engine-torque controller configured to perform an engine torque control based on the detected running condition of the vehicle, and, selectively, based on the calculated permissible engine-torque wherein the selective performance of an engine torque control based on the calculated permissible engine-torque is dependent on the detected running condition of the vehicle, and the calculated permissible engine torque is a forward driving engine torque to be delivered to one or more of the vehicle wheels.

13. The vehicle braking-force control device according to claim 12, wherein, the engine-torque controller is configured such that, if an operation of engine braking is detected when the brake controller performs the brake control, the engine-torque controller sets the engine torque at substantially zero.

14. The vehicle braking-force control device according to claim 12, wherein, the engine-torque controller is configured such that, if the running condition detected by the vehicle-behavior detector is an oversteer condition, and an operation of engine braking is not detected, the engine-torque controller reduces an engine torque to an amount lower than that of a current engine torque.

15. The vehicle braking-force control device according to claim 12, wherein the engine-torque controller is configured to set a pre-set engine torque value when the vehicle is detected to be in an oversteer condition.

16. The vehicle braking-force control device according to claim 15, wherein that preset value is zero.

17. The vehicle braking-force control device according to claim 12, wherein the brake controller is further configured to perform brake control on a rear inside turning wheel when the understeer condition is detected.

18. The vehicle braking-force control device according to claim 12, wherein the brake controller is further configured to perform brake control on a front outside turning wheel when the oversteer condition is detected.

19. The vehicle braking-force control device according to claim 12, wherein the permissible engine torque calculated by the permissible engine-torque calculator is an engine torque value that is within a range determined to prevent a loss of tire grip forces.

* * * * *